US008510926B2

(12) United States Patent
Hasselberg et al.

(10) Patent No.: US 8,510,926 B2
(45) Date of Patent: Aug. 20, 2013

(54) METHOD FOR REPAIRING A GAS TURBINE ENGINE COMPONENT

(75) Inventors: Timothy P. Hasselberg, Middletown, CT (US); William M. Rose, West Brookfield, MA (US); David A. Rutz, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 1507 days.

(21) Appl. No.: 12/114,836

(22) Filed: May 5, 2008

(65) Prior Publication Data
US 2009/0271984 A1 Nov. 5, 2009

(51) Int. Cl.
*B23P 6/00* (2006.01)

(52) U.S. Cl.
USPC ............... 29/402.08; 29/402.06; 29/402.07; 29/889.1; 228/119; 416/223 R

(58) Field of Classification Search
USPC .......... 29/402.06, 402.07, 402.08, 889.1; 228/119; 416/223 R
See application file for complete search history.

(56) References Cited

U.S. PATENT DOCUMENTS

| | | | | |
|---|---|---|---|---|
| 4,159,410 A | * | 6/1979 | Cooper | 219/137.7 |
| 4,397,471 A | * | 8/1983 | Feldman et al. | 277/412 |
| 4,441,012 A | * | 4/1984 | Risbeck et al. | 219/137 R |
| 4,549,058 A | | 10/1985 | DelMastro et al. | |
| 4,657,171 A | * | 4/1987 | Robins | 228/119 |
| 4,878,953 A | * | 11/1989 | Saltzman et al. | 148/512 |
| 4,903,888 A | | 2/1990 | Clark et al. | |
| 5,139,738 A | * | 8/1992 | Beltran et al. | 420/436 |
| 5,180,281 A | | 1/1993 | Burge | |
| 5,360,961 A | | 11/1994 | Ingall et al. | |
| 5,553,370 A | | 9/1996 | Pepe | |
| 5,645,399 A | | 7/1997 | Angus | |
| 5,794,338 A | * | 8/1998 | Bowden et al. | 29/889.1 |
| 5,812,926 A | * | 9/1998 | Wukusick et al. | 428/548 |
| 5,822,852 A | * | 10/1998 | Bewlay et al. | 29/889.1 |
| 5,823,739 A | | 10/1998 | VanDuyn | |
| 5,879,132 A | * | 3/1999 | Usami et al. | 416/223 R |
| 5,898,994 A | * | 5/1999 | Miller et al. | 29/889.1 |
| 6,106,233 A | | 8/2000 | Walker et al. | |
| 6,219,916 B1 | | 4/2001 | Walker et al. | |
| 6,332,272 B1 | * | 12/2001 | Sinnott et al. | 29/889.1 |
| 6,353,198 B1 | | 3/2002 | Tong et al. | |
| 6,468,367 B1 | | 10/2002 | Mukira et al. | |
| 6,487,491 B1 | | 11/2002 | Karpman | |
| 6,493,936 B2 | | 12/2002 | Doi et al. | |
| 6,520,401 B1 | * | 2/2003 | Miglietti | 228/194 |
| 6,531,005 B1 | | 3/2003 | Bezerra et al. | |
| 6,568,077 B1 | * | 5/2003 | Hellemann et al. | 29/889.1 |

(Continued)

FOREIGN PATENT DOCUMENTS

WO 2006125234 11/2006

OTHER PUBLICATIONS

Fronius brochure (www.fronius.com).

(Continued)

*Primary Examiner* — Carl Arbes
(74) *Attorney, Agent, or Firm* — Carlson, Gaskey & Olds, P.C.

(57) ABSTRACT

A method of repairing a stator assembly of a gas turbine engine includes removing a worn surface of the stator assembly to provide a revealed area, and securing additional material to the stator assembly utilizing gas metal arc welding.

16 Claims, 3 Drawing Sheets

(56) References Cited

U.S. PATENT DOCUMENTS

| | | | |
|---|---|---|---|
| 6,609,894 B2 | 8/2003 | Jackson et al. | |
| 6,755,924 B2 | 6/2004 | Harrison et al. | |
| 6,884,964 B2* | 4/2005 | Murphy | 219/137 R |
| 6,888,090 B2 | 5/2005 | Murphy | |
| 6,908,288 B2* | 6/2005 | Jackson et al. | 416/224 |
| 6,969,826 B2* | 11/2005 | Trewiler et al. | 219/137 R |
| 7,220,941 B2 | 5/2007 | Niedereder | |
| 7,230,203 B2 | 6/2007 | Wimroither | |
| 7,244,320 B2 | 7/2007 | Malley | |
| 7,256,368 B2 | 8/2007 | Artelsmair | |
| 7,259,349 B2 | 8/2007 | Stieglbauer | |
| 7,291,808 B2 | 11/2007 | Burgstaller | |
| 7,335,427 B2* | 2/2008 | Sathian | 428/668 |
| 7,546,684 B2* | 6/2009 | Caldwell et al. | 29/889.1 |
| 7,789,288 B1* | 9/2010 | Johnson et al. | 228/119 |
| 7,854,064 B2* | 12/2010 | Malley | 29/889.1 |
| 8,091,228 B2* | 1/2012 | Hiskes | 29/889.1 |
| 2005/0181231 A1* | 8/2005 | Gupta et al. | 428/668 |
| 2005/0274009 A1* | 12/2005 | Powers | 29/889.1 |
| 2006/0125234 A1 | 6/2006 | Ernst | |
| 2006/0134454 A1* | 6/2006 | Sathian | 428/668 |
| 2007/0056944 A1 | 3/2007 | Artelsmair | |
| 2007/0221631 A1 | 9/2007 | Ruokolainen | |
| 2008/0237306 A1* | 10/2008 | Sathian | 228/119 |
| 2009/0271984 A1* | 11/2009 | Hasselberg et al. | 29/889.1 |

OTHER PUBLICATIONS

Article found at www.aws.org/wj/2005106/038/ entitled: "Cold Metal Transfer Has a Future Joining Steel to Aluminum" by Jergen Bruckner.

Summary Report, SR0706, Cooperative Research Program, Jun. 2007.

"Improved Methods for High-Alloy Buildups," EWi, Materials Joining Technology, Jun. 28, 2007.

U.S. Appl. No. 12/113,980, filed May 2, 2008, entitled "Gas Turbine Engine Case With Replaced Flange and Method of Repairing the Same Using Cold Metal Transfer".

U.S. Appl. No. 12/113,987, filed May 2, 2008, entitled "Repaired Internal Holding Structures for Gas Turbine Engine Cases and Method of Repairing the Same".

Extended European Search Report for Application No. EP 09 25 0802 dated Jun. 20, 2012.

* cited by examiner

METHOD FOR REPAIRING A GAS TURBINE ENGINE COMPONENT

BACKGROUND OF THE DISCLOSURE

This disclosure relates to a method for repairing a worn surface of a gas turbine engine component.

Gas turbine engines typically include a compressor section, a combustor section and a turbine section. Air is pressurized in the compressor section, and is mixed with fuel and burned in the combustor section to energize and expand the air and accelerate the airflow into the turbine section. The hot combustion gases that exit the combustor section flow downstream through the turbine section, which extracts kinetic energy from the expanding gases and converts the energy into mechanical power to drive the compressor section.

The compressor section of the gas turbine engine typically includes multiple compression stages to obtain high pressure levels. Each compressor stage consists of alternating rows of stator assemblies that include stationary airfoils called stator vanes followed by rotor assemblies including moving airfoils called rotor blades. The stator vanes direct incoming airflow to the next set of rotor blades.

During operation, portions of the stator assemblies may become worn as a result of rubbing that occurs between the stator assemblies and surrounding components of the gas turbine engine. The rubbing may wear and stress portions of the stator assemblies.

Replacing an entire stator assembly is expensive due to material and machining costs. Accordingly, stator assemblies are often repaired instead of replaced. The repairs generally involve removing the worn surfaces of the stator assembly, and then restoring them with weld filler or similar material on a surface of the component. The material build-up is machined to an appropriate shape to form a restored surface.

A known gas tungsten arc (GTA) welding process is generally used to repair worn surfaces of gas turbine engine components. The GTA welding process may be performed manually or robotically to deposit weld material on a worn area of the component. However, GTA welding is a relatively slow build-up process that, because of the inherent heat input, can cause unacceptable component distortion. These aspects have prompted the aerospace industry to seek faster and less heat intensive welding processes.

SUMMARY OF THE INVENTION

A method of repairing a stator assembly of a gas turbine engine includes removing a worn surface of the stator assembly to provide a revealed area, and securing additional material to the stator assembly utilizing gas metal arc welding.

A gas turbine engine component includes a stator assembly having at least one repairable surface. The stator includes a repaired section. Additional material is deposited on the at least one repairable surface to fabricate the repaired section using gas metal arc welding.

The various features of the example disclosure can be best understood from the following detailed description. The drawings that accompany the detailed description can be briefly described as follows.

DETAILED DESCRIPTION OF THE DISCLOSED EMBODIMENT

Figure 1:
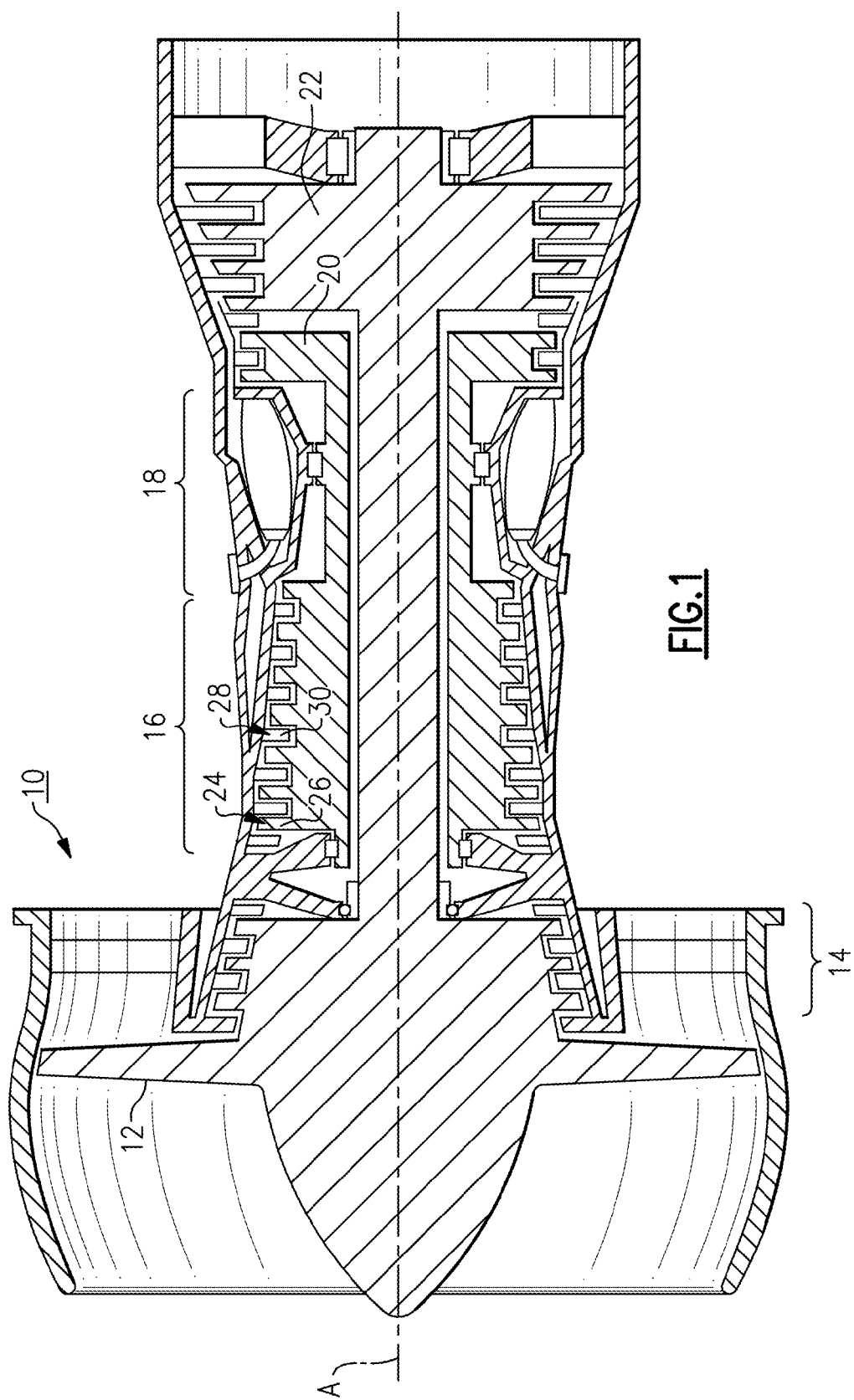
FIG. 1 is a schematic view of an example gas turbine engine.

FIG. 1 schematically illustrates an example gas turbine engine 10 that is circumferentially disposed about an engine centerline axis A. The gas turbine engine 10 includes (in serial flow communication) a fan section 12, a low pressure compressor 14, a high pressure compressor 16, a combustor section 18, a high pressure turbine 20, and a low pressure turbine 22. During operation, airflow is drawn into the gas turbine engine 10 by the fan section 12, and is pressurized in the low pressure compressor 14 and the high pressure compressor 16. Fuel is mixed with the pressurized air and combusted within the combustor section 18. The combustion gases are discharged through the high pressure turbine 20 and the low pressure turbine 22, which extract energy from the combustion gases for powering the compressor sections 14, 16 and the fan section 12.

The low pressure compressor 14 and the high pressure compressor 16 include a plurality of alternating rows of rotor assemblies 24 having blades 26 and stator assemblies 28 including vanes 30. It should be understood that the various features and example illustrations presented herein are not limited to a gas turbine engine of this particular architecture. That is, the present disclosure is applicable to any engine architecture, and for any application.

Figure 2:
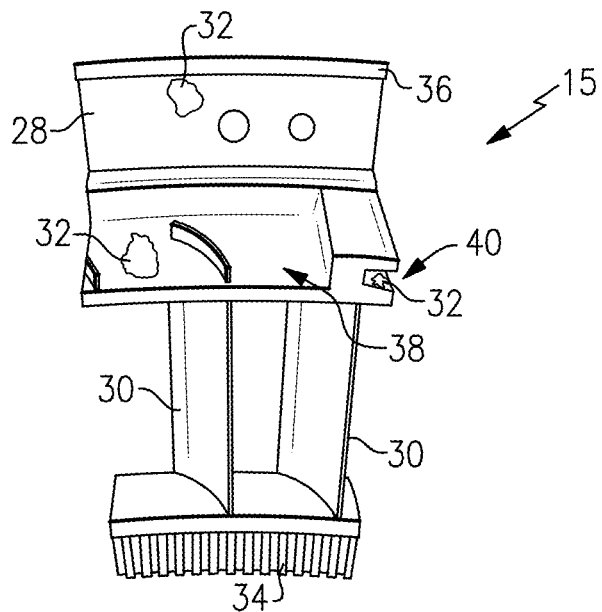
FIG. 2 illustrates a gas turbine engine component including a worn surface.

FIG. 2 illustrates an example gas turbine engine component 15 having at least one worn surface 32. In this example, the gas turbine engine component 15 is a stator assembly 28 of the high pressure compressor 16. The stator assembly 28 includes a plurality of vanes 30 that extend between a radially inward honeycomb 34 and a radially outward flange 36. The flange 36 includes an outer diameter surface 38 and a plurality of featherseal slots 40 (one shown in FIG. 2).

The worn surfaces 32 may occur at any location of the stator assembly 28, including but not limited to, the flange 36, the outer diameter surface 38 and/or the featherseal slot 40. In one example, the worn surface 32 includes a crack in the outer diameter surface 38. The worn surfaces 32 may be caused by the rubbing, vibration and/or extreme temperatures that occur during gas turbine engine 10 operation. The worn surfaces 32 are repairable utilizing a gas metal arc welding operation, as is further discussed below. Although the disclosed examples are illustrated with respect to a stator assembly 28 of a high pressure compressor 16, it should be understood that the disclosed examples may be applied to any gas turbine engine component.

Figure 3:
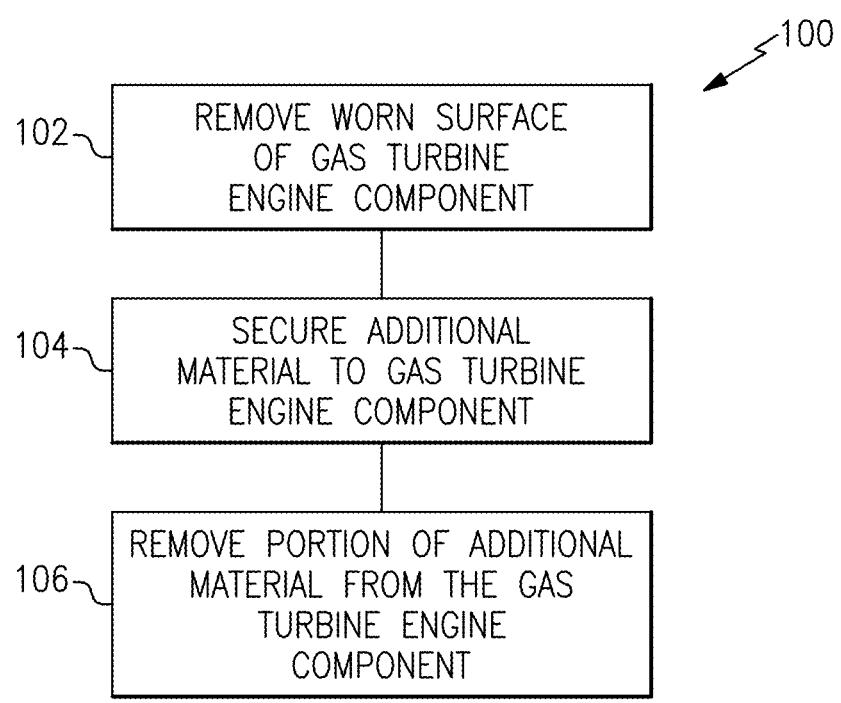
FIG. 3 illustrates an example method for repairing the gas turbine engine component illustrated in FIG. 2.

FIG. 3, with continued reference to FIGS. 1 and 2, illustrates an example method 100 for repairing a gas turbine engine component 15. The method 100 begins at step block 102 where a worn surface 32 of the gas turbine engine component 15 is removed. In one example, the worn surface 32 is removed by utilizing a machining operation. A person of ordinary skill in the art having the benefit of this disclosure would be able to select an appropriate machining operation for removal of the worn surfaces 32 of the gas turbine engine component 15. In one example, the worn surface 32 is machined down to remove any damaged portion of the gas turbine engine component 15 (See FIG. 4A).

Next, at step block 104, additional material is secured to the gas turbine engine component 15 utilizing gas metal arc welding. In one example, the gas metal arc welding includes cold metal transfer. Cold metal transfer is a process developed by the Fronius Corporation and is known. However, gas metal arc welding has not been utilized to repair a worn surface of a gas turbine engine component 15, such as a stator assembly 28 of a high pressure compressor 16, for example. The additional material is secured to the gas turbine engine component 15 in an area of the removed worn surface 32.

At step block 106, a portion of the additional material is removed from the gas turbine engine component 15. In one example, the portion of the additional material is removed via a machining operation. The additional material is removed down to a pre-defined dimension. In one example, the pre-defined dimension includes an original dimension of the gas turbine engine component.

Figure 4A:
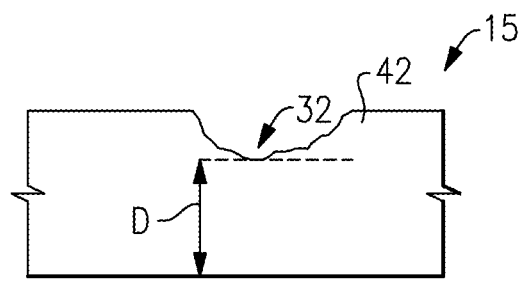
FIG. 4A shows an initial step in an example repair process.
Figure 4B:
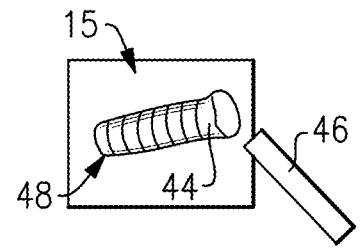
FIG. 4B shows a subsequent step of the repair process.
Figure 4C:
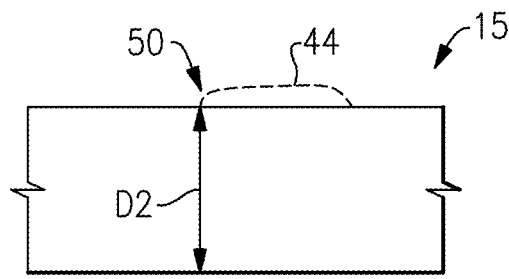
FIG. 4C illustrates yet another step in the repair process.

FIGS. 4A-4C describe an example implementation of the method 100. Referring to FIG. 4A, an initial step in the repair of the gas turbine engine component 15 includes machining the worn surface 32 down to a predefined dimension D. Machining the worn surface 32 down to the predefined dimension D includes removal of sufficient material to remove any damaged portion of the gas turbine engine component 15, in this example. The actual predefined dimension D will vary depending upon design specific parameters including, but not limited to, the degree of damage to the gas turbine engine component.

As shown in FIG. 4B, additional material 44 is secured to the gas turbine engine component 15 utilizing a gas metal arc welder 46, for example. In one example, the additional material 44 is secured to the gas turbine engine component with a manually controlled gas metal arc welder 46. In another example, the additional material 44 is secured using a robotically controlled gas metal arc welder 46. As described above, the gas metal arc welder 46 can include cold metal transfer. The additional material 44 is secured to a revealed area 48 of the gas turbine engine component 15. The revealed area 48 is provided by removal of the worn surface 32, in one example.

FIG. 4C illustrates removal of a portion of the additional material 44 from the gas turbine engine component 15. The additional material 44 is removed down to a predefined dimension D2 to provide a repaired section 50 of the gas turbine engine component 15. In one example, the predefined dimension D2 relates to an original dimension of the gas turbine engine component 15.

The example gas metal arc welding operation of the present disclosure facilitates a low heat input, high deposition, and spatter free weld process for repairing worn surfaces of a gas turbine engine component. For example, the gas metal arc welding operation may be utilized to repair a worn surface of a stator assembly of a gas turbine engine.

The foregoing description shall be interpreted as illustrative and not in any limiting sense. A worker of ordinary skill in the art would understand that certain modifications would come within the scope of this disclosure. For these reasons, the following claims should be studied to determine the true scope and content of this disclosure.

What is claimed is:

1. A method for repairing a stator assembly of a gas turbine engine, comprising the steps of:
   a) removing a worn surface of the stator assembly to provide a revealed area; and
   b) securing additional material to the stator assembly utilizing gas metal arc welding.

2. The method as recited in claim 1, wherein said step a) includes the step of:
   machining the worn surface down to a predefined dimension.

3. The method as recited in claim 2, wherein the step of machining the worn surface down to the predefined dimension includes removal of sufficient material to remove any damaged portion of the stator assembly.

4. The method as recited in claim 1, wherein the gas metal arc welding includes cold metal transfer.

5. The method as recited in claim 1, wherein said step b) includes the step of:
   securing the additional material to the revealed area of the stator assembly.

6. The method as recited in claim 1, wherein the step of removing is performed prior to the step of securing.

7. The method as recited in claim 1, comprising the step of:
   c) removing a portion of the additional material.

8. The method as recited in claim 7, wherein said step c) includes the step of:
   machining the additional material down to a predefined dimension.

9. The method as recited in claim 7, wherein the step of removing the portion of the additional material includes machining the additional material down to an original dimension of the component.

10. The method as recited in claim 1, wherein the stator assembly is a component of a high pressure compressor of the gas turbine engine.

11. The method as recited in claim 1, wherein the worn surface is a flange of the stator assembly.

12. The method as recited in claim 1, wherein the worn surface is a featherseal slot of the stator assembly.

13. The method as recited in claim 1, wherein the worn surface is a crack in the stator assembly.

14. The method as recited in claim 1, wherein the additional material is applied manually to the stator assembly.

15. The method as recited in claim 1, wherein the additional material is applied robotically to the stator assembly.

16. A method for repairing a gas turbine engine component, comprising the steps of:
   removing a damaged portion of the component in a first machining operation to provide a revealed area;
   securing additional material to the revealed area of the component using gas metal arc welding, wherein the gas metal arc welding includes a cold metal transfer process; and
   removing at least a portion of the additional material in a second machining operation.

* * * * *